US009939514B2

(12) United States Patent
Adachi et al.

(10) Patent No.: US 9,939,514 B2
(45) Date of Patent: Apr. 10, 2018

(54) DETERMINATION OF A STATISTICAL ATTRIBUTE OF A SET OF MEASUREMENT ERRORS

(71) Applicant: HERE Global B.V., Eindhoven (NL)

(72) Inventors: Jeffrey Adachi, El Cerrito, CA (US); Andrew Lewis, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 281 days.

(21) Appl. No.: 14/788,753

(22) Filed: Jun. 30, 2015

(65) Prior Publication Data
US 2017/0003396 A1    Jan. 5, 2017

(51) Int. Cl.
G01C 21/00    (2006.01)
G01S 5/00    (2006.01)
G01S 19/39    (2010.01)
G01S 19/40    (2010.01)

(52) U.S. Cl.
CPC .............. *G01S 5/009* (2013.01); *G01S 19/39* (2013.01); *G01S 19/40* (2013.01)

(58) Field of Classification Search
CPC ................................ G01S 5/009; G01S 19/39
USPC ......................................................... 701/446
See application file for complete search history.

(56) References Cited

U.S. PATENT DOCUMENTS

| 5,311,195 | A | * | 5/1994 | Mathis | G01S 19/49 342/357.29 |
|---|---|---|---|---|---|
| 6,385,539 | B1 | | 5/2002 | Wilson et al. | |
| 8,620,339 | B2 | | 12/2013 | McCormick | |
| 8,725,404 | B2 | * | 5/2014 | Kmiecik | G01C 21/32 701/400 |
| 2009/0138497 | A1 | | 5/2009 | Zavoli et al. | |
| 2012/0004845 | A1 | * | 1/2012 | Kmiecik | G01C 21/32 701/445 |
| 2013/0030690 | A1 | * | 1/2013 | Witmer | G01C 21/32 701/409 |
| 2014/0132608 | A1 | | 5/2014 | Mund et al. | |

OTHER PUBLICATIONS

Harris, Phil, Inertial Sensors Dramatically Improve GNSS for ITS Applications, ITS International, Jul. Aug. 2011, 3 pages.

\* cited by examiner

*Primary Examiner* — Muhammad Shafi
(74) *Attorney, Agent, or Firm* — Alston & Bird LLP

(57) ABSTRACT

A method comprising receiving probe data indicative of a set of navigational signal measurements that is matched to a link segment, determining a set of measurement errors such that each measurement error of the set of measurement errors is a difference between a location indicated by the link segment and a location indicated by a navigational signal measurement of the set of navigational signal measurements, determining at least one statistical attribute of the set of measurement errors, and storing an indication of the statistical attribute in map information associated with the link segment is disclosed.

20 Claims, 11 Drawing Sheets

DETERMINATION OF A STATISTICAL ATTRIBUTE OF A SET OF MEASUREMENT ERRORS

TECHNICAL FIELD

The present application relates generally to determination of a statistical attribute of a set of measurement errors.

BACKGROUND

Over the years, society has become increasingly reliant upon electronic apparatuses. For example, many individuals utilize their electronic apparatuses for purposes relating to mapping, navigation, routing, and/or the like. Additionally, modern advances in assisted-driving automobiles and self-driving automobiles have necessitated a high degree of accuracy regarding the position of such automobiles. As such, it may be desirable to configure an apparatus such that the apparatus may facilitate such functionality.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for receiving probe data indicative of a set of navigational signal measurements that is matched to a link segment, determining a set of measurement errors such that each measurement error of the set of measurement errors is a difference between a location indicated by the link segment and a location indicated by a navigational signal measurement of the set of navigational signal measurements, determining at least one statistical attribute of the set of measurement errors, and storing an indication of the statistical attribute in map information associated with the link segment.

One or more example embodiments may provide an apparatus, a computer readable medium, a computer program product, and/or a non-transitory computer readable medium having means for receiving probe data indicative of a set of navigational signal measurements that is matched to a link segment, means for determining a set of measurement errors such that each measurement error of the set of measurement errors is a difference between a location indicated by the link segment and a location indicated by a navigational signal measurement of the set of navigational signal measurements, means for determining at least one statistical attribute of the set of measurement errors, and means for storing an indication of the statistical attribute in map information associated with the link segment.

In at least one example embodiment, the statistical attribute is a variance of the set of measurement errors.

In at least one example embodiment, the determination of the statistical attribute comprises determination of an adjusted statistical attribute of the set of measurement errors In at least one example embodiment, the determination of the adjusted statistical attribute is based, at least in part, on an average lane width and a number of lanes comprised by the link segment.

In at least one example embodiment, the statistical attribute is the adjusted statistical attribute.

One or more example embodiments further perform identifying the location indicated by the link segment to be a location along the link segment from which the location indicated by the navigational signal measurement is perpendicular.

One or more example embodiments further perform identification of the location indicated by the link segment to be a location along the link segment that is nearest to the location indicated by the navigational signal measurement.

In at least one example embodiment, the difference between the link segment location and the location indicated by the navigational signal measurement is based, at least in part, on a perpendicular distance from the link segment to the location indicated by the navigational signal measurement.

In at least one example embodiment, the difference between the link segment location and the location indicated by the navigational signal measurement is the perpendicular distance from the link segment to the location indicated by the navigational signal measurement.

One or more example embodiments further perform receipt of different probe data indicative of a different set of navigational signal measurements that is matched to a different link segment, determination of a different set of measurement errors such that each measurement error of the different set of measurement errors is a difference between a location indicated by the different link segment and a location indicated by a navigational signal measurement of the different set of navigational signal measurements, determination of at least one different statistical attribute of the different set of measurement errors, and storing of the different statistical attribute in map information associated with the different link segment.

One or more example embodiments further perform sending of the indication of the statistical attribute to a separate apparatus.

One or more example embodiments further perform sending of the map information to a separate apparatus.

In at least one example embodiment, the map information comprises the indication of the statistical attribute;

In at least one example embodiment, the separate apparatus is a navigational signal receiver.

One or more example embodiments further perform determination of a navigational signal measurement weight that is based, at least in part, on the indication of the statistical attribute.

In at least one example embodiment, the navigational signal measurement weight is inversely proportional to the statistical attribute.

In at least one example embodiment, the indication of the statistical attribute is indicative of the navigational signal measurement weight.

In at least one example embodiment, indication of the statistical attribute is the navigational signal measurement weight.

In at least one example embodiment, the indication of the statistical attribute identifies a predetermined range that comprises the navigational signal measurement weight.

In at least one example embodiment, the navigational signal measurement weight designates a Kalman filter weight to be applied to a navigational signal measurement received by a navigational signal receiver.

In at least one example embodiment, the navigational signal measurement weight designates a Kalman filter weight to be applied to a navigational signal measurement received by a navigational signal receiver in circumstances where a location of the navigational signal receiver corresponds with a location indicated by the link segment.

In at least one example embodiment, the indication of the statistical attribute is the statistical attribute.

In at least one example embodiment, the indication of the statistical attribute identifies a predetermined range that comprises the statistical attribute.

BRIEF DESCRIPTION OF THE DRAWINGS

For a more complete understanding of one or more example embodiments, reference is now made to the following descriptions taken in connection with the accompanying drawings in which.

DETAILED DESCRIPTION OF THE DRAWINGS

Figure 1:
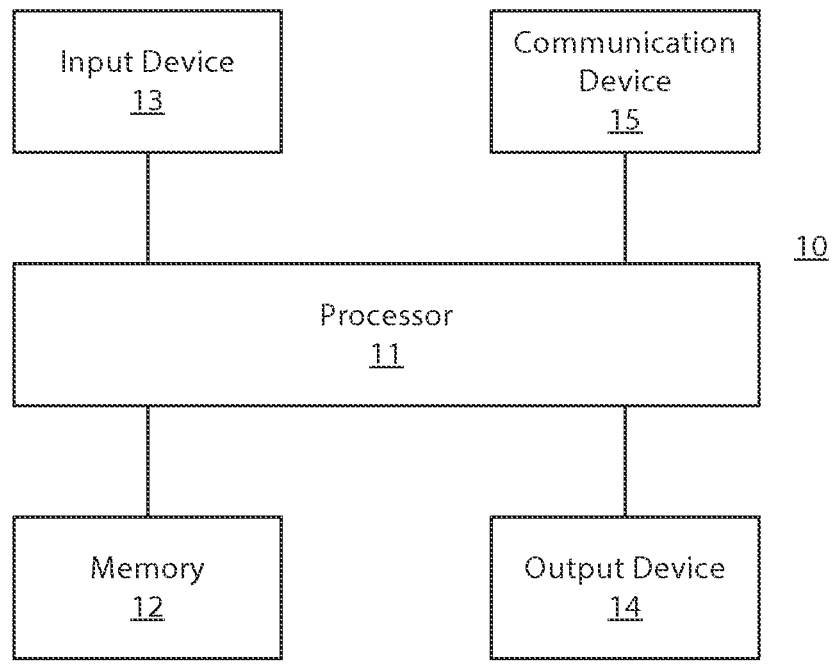
FIG. 1 is a block diagram showing an apparatus according to at least one example embodiment.

Various example embodiments and some of their potential advantages are understood by referring to FIGS. 1 through 10 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, an infotainment system, a navigation system, an electronic automobile component, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy-press touch input and a light-press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media-capturing element. The media-capturing element may be any means for capturing an image, video, and/or audio for storage, display, or transmission. For example, in at least one example embodiment in which the media-capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

One or more example embodiments may include a geographic database. For example, the geographic database may comprise probe data associated with FIG. 5A, navigational attributes associated with FIG. 3, and/or the like. For example, the geographic database may include node data records, road segment or link data records, point of interest (POI) data records, perspective image data records, video content data records, and other data records. More, fewer or different data records may be provided. In at least one example embodiment, the other data records include cartographic ("carto") data records, routing data, and maneuver data. One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via position or GPS data associations (such as using known or future map matching or geo-coding techniques), for example.

In at least one example embodiment, the road segment data records are links or segments representing roads, streets, or paths, as may be used in the calculated route or recorded route information for determination of one or more personalized routes. The node data records may be end points corresponding to the respective links or segments of the road segment data records. The road link data records and the node data records may represent a road network, such as used by vehicles, cars, and/or other entities. Alternatively, the geographic database may contain path segment and node data records or other data that represent pedestrian paths or areas in addition to or instead of the vehicle road record data, for example.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database may include data about the POIs and their respective locations in the POI data records. The geographic database may also include data about places, such as cities, towns, or other communities, and other geographic features, such as bodies of water, mountain ranges, etc. Such place or feature data may be part of the POI data or may be associated with POIs or POI data records (such as a data point used for displaying or representing a position of a city). In addition, the geographic database may include and/or be associated with event data (e.g., traffic incidents, constructions, scheduled events, unscheduled events, etc.) associated with the POI data records or other records of the geographic database.

The geographic database may be maintained by a content provider (e.g., a map developer) in association with a services platform. By way of example, the map developer may collect geographic data to generate and enhance the geographic database. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used.

The geographic database may be a master geographic database stored in a format that facilitates updating, maintenance, and development. For example, the master geographic database or data in the master geographic database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation apparatuses or systems.

Geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation apparatus, such as by an end user apparatus, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation apparatus developer or other end user apparatus developer, may perform compilation on a received geographic database in a delivery format to produce one or more compiled navigation databases.

As mentioned above, a server side geographic database may be a master geographic database, but in alternate embodiments, a client side geographic database may represent a compiled navigation database that may be used in or with an end user apparatus to provide navigation and/or map-related functions. For example, the geographic database may be used with an end user apparatus to provide an end user with navigation features. In such an example, the geographic database may be downloaded or stored on the end user apparatus, such as in one or more applications, or the end user apparatus may access the geographic database through a wireless or wired connection (such as via a server and/or a communication network), for example.

In at least one example embodiment, the end user apparatus is one of an in-vehicle navigation system, a personal navigation device (PND)/personal navigation apparatus, a portable navigation device/portable navigation apparatus, a cellular telephone, a mobile phone, a personal digital assistant (PDA), a watch, a camera, a computer, and/or other apparatuses that may perform navigation-related functions, such as digital routing and map display. In at least one example embodiment, the navigation apparatus is a cellular telephone. An end user may use the end user apparatus for navigation and map functions such as guidance and map display, for example, and for determination of one or more personalized routes or route segments based, at least in part, on one or more calculated and recorded routes, according to exemplary embodiments.

Figure 2:
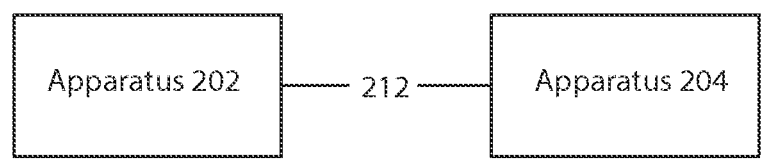
FIG. 2 is a diagram illustrating apparatus communication according to at least one example embodiment.

FIG. 2 is a diagram illustrating apparatus communication according to at least one example embodiment. The example of FIG. 2 is merely an example and does not limit the scope of the claims. For example, apparatus count may vary, apparatus configuration may vary, communication channels may vary, and/or the like.

In the example of FIG. 2, apparatus 202 is an electronic apparatus. An electronic apparatus may be an electronic apparatus that a user commonly utilizes during performance of various tasks, activities, and/or the like. For example, apparatus 202 may be an electronic apparatus that the user frequently utilizes to view map information, to browse map information, to search for points of interests, to provide routing information which may be used to travel to a particular destination, etc. For example, the electronic apparatus may be a phone, a tablet, a computer, a laptop, a near eye apparatus, and/or the like. In the example of FIG. 2, apparatus 204 is a separate apparatus, such as a separate electronic apparatus. For example, separate electronic apparatus may be used collaboratively with the electronic apparatus, in conjunction with the apparatus, in addition to the electronic apparatus, such that the separate apparatus is supporting one or more services associated with the electronic apparatus, and/or the like. In another example, the separate electronic apparatus may be utilized to store information associated with the electronic apparatus, to process information received from the electronic apparatus, and/or the like. For example, a separate electronic apparatus may be a phone, a tablet, a computer, a laptop, a server, a database, a cloud platform, a near eye apparatus, and/or the like. Although the aforementioned example describes apparatus 202 and apparatus 204 as distinct types of apparatuses, namely, an electronic apparatus and a separate electronic apparatus, in some circumstances, the apparatuses may both be electronic apparatuses, both be separate electronic apparatuses, and/or the like.

In the example of FIG. 2, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. A communication channel, for example, may be a channel utilized for sending and/or receiving of information, data, communications, and/or the like, between two or more apparatuses. It should be understood that, even though the example of FIG. 2 illustrates a direct communication channel between apparatus 202 and apparatus 204, there may be intermediate apparatuses that facilitate communication between apparatus 202 and apparatus 204. For example, there may be one or more routers, hubs, switches, gateways, and/or the like, that are utilized in the communication channels between apparatus 202 and apparatus 204. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, an apparatus may be a phone, a tablet, a computer, a display, a monitor, a head mounted display, a see through display, a wearable apparatus, a head worn apparatus, a hand worn apparatus, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short-range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2, apparatus 202 communicates with apparatus 204 by way of a communication channel 212. In the example of FIG. 2, communication channel 212 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2, apparatus 202 communicates with apparatus 204 by way of communication channel 212. In the example of FIG. 2, communication channel 212 may be a local area network communication channel, a wide area network communication channel, an internet communication channel, a cellular communication channel, and/or the like.

Figure 3:
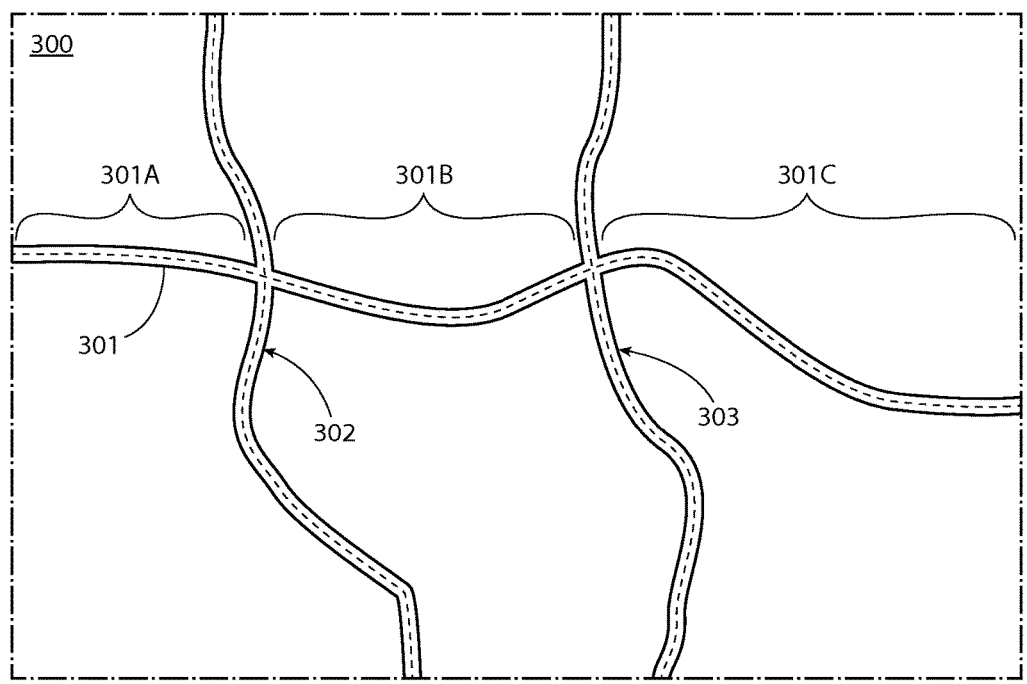
FIG. 3 is a diagram illustrating link segments according to at least one example embodiment.

FIG. 3 is a diagram illustrating link segments according to at least one example embodiment. The example of FIG. 3 is merely an example and does not limit the scope of the claims. For example, the number of link segments may vary, the type of link segments may vary, the direction of link segments may vary, the arrangement of link segments may vary, and/or the like.

Oftentimes, portions of a road, a highway, a street, and/or the like may be distinct. For example, a highway may be marked with distance markers, a street may be divided by intersections, and/or the like. A portion of a route, a lane, a road, a highway, a street, a trail, a thoroughfare, and/or the like may be referred to as a link segment. For example, a link segment may be a portion of a road between two intersections, a route between two cities, a portion of a street over a predefined distance (e.g. a mile, a kilometer, 100 meters, and/or the like), and/or the like. In at least one example embodiment, a link segment comprises at least a portion of a route, a lane, a road, a highway, a street, a trail, a thoroughfare, and/or the like.

The example of FIG. 3 illustrates representation 300 of a portion of a map comprising roads 301, 302, and 303. Roads 301, 302 and 303 may each comprise one or more link segments. It can be seen in the example of FIG. 3 that road 301 is intersected by roads 302 and 303. In this manner, road 301 may be subdivided into link segments 301A, 301B, and 301C. Even though the example of FIG. 3 illustrates particular link segments of a road being defined by intersections along that road, it should be understood that any portion of a route, a lane, a road, a highway, a street, a trail, a thoroughfare, and/or the like may be a link segment.

Figure 4A:
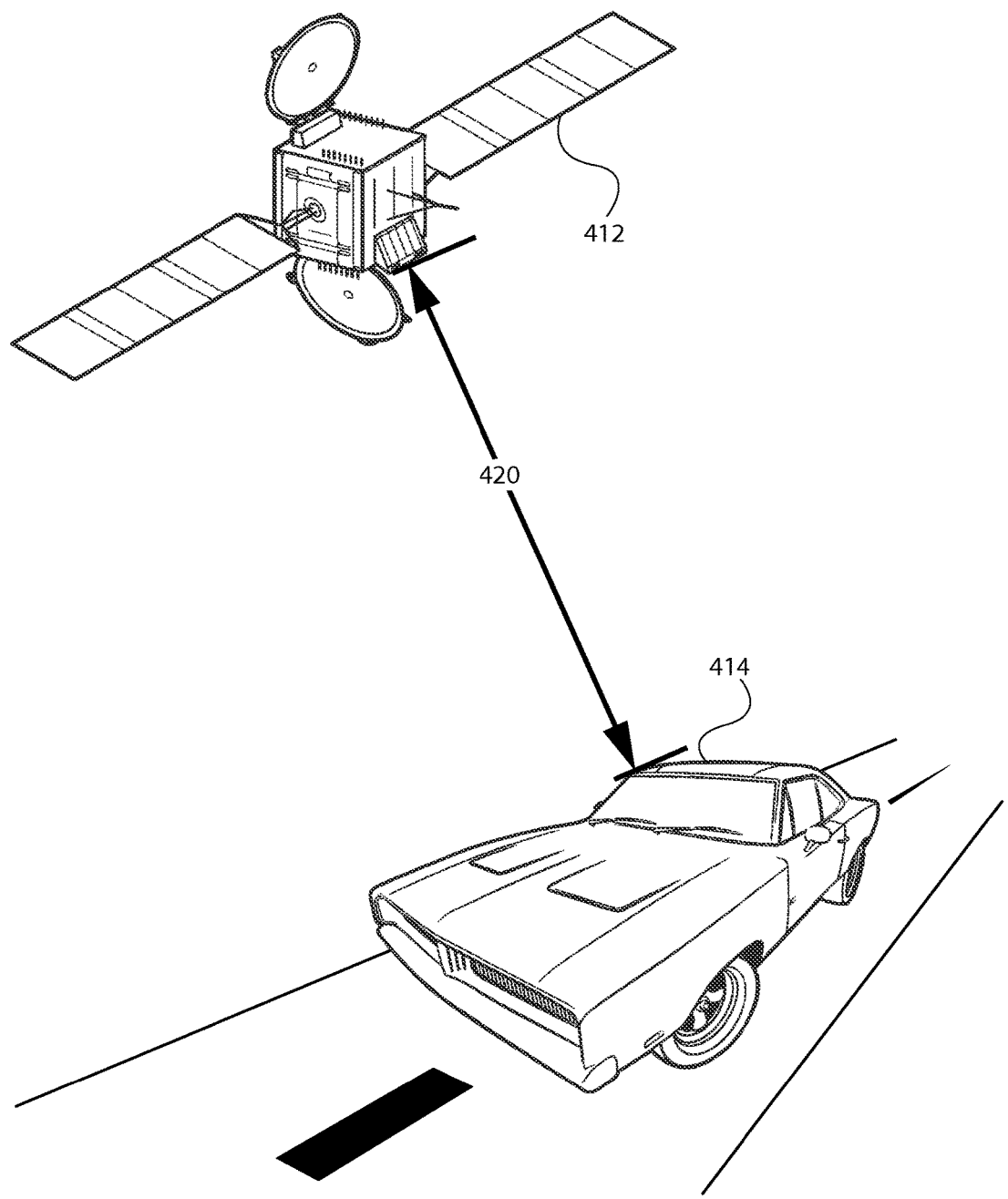
FIGS. 4A-4B are diagrams illustrating a pseudorange according to at least one example embodiment.
Figure 4B:
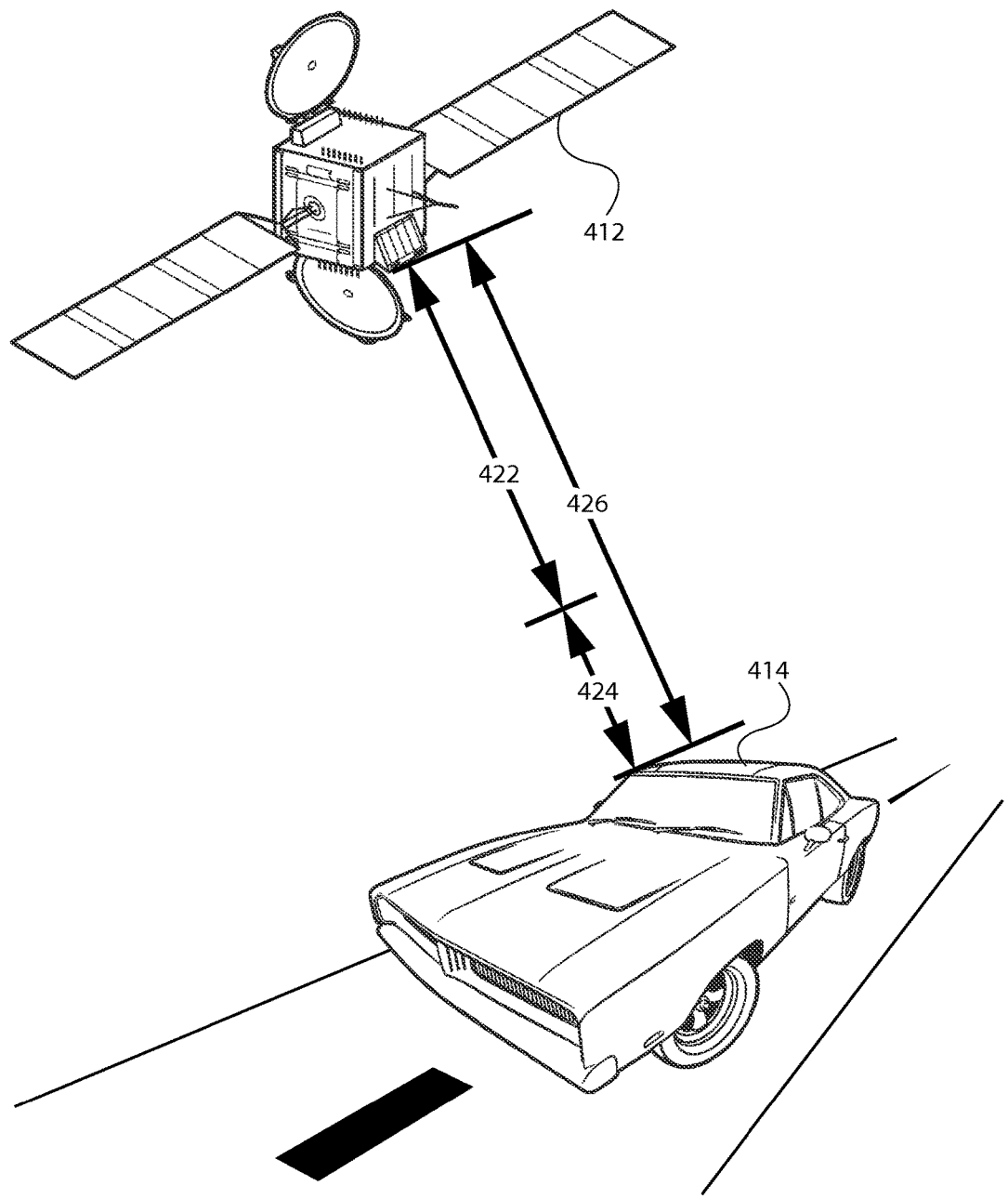

FIGS. 4A-4B are diagrams illustrating a pseudorange according to at least one example embodiment. The examples of FIGS. 4A-4B are merely examples and do not limit the scope of the claims. For example, the number, type, configuration, etc. of satellites may vary, the pseudorange may vary, the relative points used to measure the pseudorange may vary, and/or the like.

In many circumstances, it may be desirable to identify a position of a particular apparatus. For example, such a position may be used to support various navigation operations, routing functionality, assisted-driving technology, and/or the like. In such circumstances, an apparatus may utilize the Global Positioning System (GPS), the Global Navigation Satellite System (GLONASS), the Galileo satellite system, any satellite-based positioning system, and/or the like. GPS is a space-based satellite navigation system that provides location and time information in all weather conditions, anywhere on or near the earth, and where there is an unobstructed line of sight to four or more GPS satellites. Each GPS satellite continually broadcasts a signal that includes various GPS data. Such GPS data may include, for example, a pseudorandom code that is known to the receiver. By time-aligning a receiver-generated version and the receiver-measured version of the code, the time of arrival (TOA) of a defined point in the code sequence, called an epoch, can be found in the receiver clock time scale. Additionally, the GPS data may include the time of transmission (TOT) of the code epoch and the satellite position at that time. An apparatus, such as a GPS receiver, measures the TOAs, according to its own clock, of four satellite signals. Based on the TOAs and the TOTs, the apparatus calculates four or more time of flight (TOF) values. The apparatus may then compute its three-dimensional position and clock deviation from the four or more TOFs. The three-dimensional position is often a set of three-dimensional Cartesian coordinates with origin at the earth's center. To facilitate utilization of this three-dimensional position, the earth-centered solution location may be converted to latitude, longitude, and altitude.

In at least one example embodiment, an apparatus receives GPS data from a plurality of GPS satellites. In such an example embodiment, the apparatus may subsequently determine a measured satellite pseudorange for each GPS satellite of the plurality of GPS satellites based, at least in part, on the GPS data. The measured satellite pseudorange of a GPS satellite is the pseudo distance between the GPS satellite and the apparatus, such as a GPS receiver. This distance is referred to as a pseudo distance due to the fact that the distance is not precise and is, instead, an estimation that is based, at least in part, on the TOF multiplied by the speed of light. To determine its position, an apparatus may determine the pseudoranges to at least four GPS satellites, as well as the positions of the at least four GPS satellites at the time of transmission. A position of a GPS satellite may be calculated for any point in time based, at least in part, on the orbital parameters of the GPS satellite. The pseudorange for each GPS satellite of the plurality of GPS satellites may be calculated by multiplying the speed of light by the time the signal has taken from each GPS satellite to reach the apparatus. As there are accuracy errors in the time measured, the term pseudorange is used, rather than ranges, for such distances. As such, in such an example embodiment, the measured satellite pseudorange for a particular GPS satellite of the plurality of GPS satellites may be a calculated distance between the particular GPS satellite and the apparatus. A calculated distance between a GPS satellite and an apparatus may be referred to as a navigational signal measurement.

Even though the above discussion relates to GPS, GPS data, GPS satellites, and/or the like, it should be understood that any satellite-based positioning system may be utilized. For example, any data from any satellite-based positioning system and any satellites associated with any satellite-based positioning system may be utilized. For example, the apparatus may receive GLONASS data from at least one GLONASS satellite, may receive Galileo data from at least one Galileo satellite, and/or the like. In such examples, the apparatus may determine a measured satellite pseudorange for each GLONASS satellite of a plurality of GLONASS satellites, for each Galileo satellite of the plurality of Galileo satellites, and/or the like.

FIG. 4A is a diagram illustrating a pseudorange according to at least one example embodiment. The example of FIG. 4A depicts satellite 412, apparatus 414, and measured satellite pseudorange 420. In the example of FIG. 4A, satellite 412 may be any positioning system satellite, a GPS satellite, and/or the like. Apparatus 414 may be an automobile, a GPS receiver comprised by an automobile, an electronic apparatus comprised by an automobile, and/or the like. In the example of FIG. 4A, apparatus 414 receives GPS data from at least satellite 412, and determines measured satellite pseudorange 420 for satellite 412 based, at least in part, on the GPS data. In such an example, measured satellite pseudorange 420 for satellite 412 may be a calculated distance between satellite 412 and apparatus 414. In the example of FIG. 4A, measured satellite pseudorange 420 may be calculated based, at least in part, on a position of satellite 412, a time of transmission, a time of arrival, the speed of light, and/or the like.

The manner in which a position is determined by way of GPS data is prone to errors due to the heavy reliance on accurate time keeping. As such, even the minutest discrepancies in time synchronization amongst GPS satellites and apparatuses, such as GPS receivers, results in very large positioning errors. For example, an apparatus may utilize a quartz oscillator to maintain time. The accuracy of such a quartz-based clock, in general, may be worse than one part in a million. If such a clock has not been corrected for a week, a measured satellite pseudorange based on that clock's time may result in a measured satellite pseudorange that places the apparatus not on the surface of Earth, but outside the Moon's orbit. Even if the clock is corrected, a second later the clock is again unusable for accurate calculation of a measured satellite pseudorange because, after a second, the error may result in determination of a position that is erroneous by hundreds of meters.

FIG. 4B is a diagram illustrating a pseudorange according to at least one example embodiment. The example of FIG. 4B depicts satellite 412, apparatus 414, measured satellite pseudorange 422, pseudorange error 424, and actual pseudorange 426. In the example of FIG. 3B, satellite 412 may be any positioning system satellite, a GPS satellite, and/or the like. Apparatus 414 may be an automobile, a GPS receiver comprised by an automobile, an electronic apparatus comprised by an automobile, and/or the like. In the example of FIG. 4B, apparatus 414 receives GPS data from at least satellite 412, and determines measured satellite pseudorange 422 for satellite 412 based, at least in part, on the GPS data. In such an example, measured satellite pseudorange 422 for satellite 412 may be a calculated distance between satellite 412 and apparatus 414. In the example of FIG. 4A, measured satellite pseudorange 422 may be calculated based, at least in part, on a position of satellite 412, a time of transmission, a time of arrival, the speed of light, and/or the like. As depicted in the example of FIG. 4B, actual pseudorange 426 is the actual distance between satellite 412 and apparatus 414. As can be seen, actual pseudorange 426 differs from measured satellite pseudorange 422 by an amount equal to pseudorange error 424. A pseudorange error may be referred to as a measurement error.

In this manner, measured satellite pseudorange 422 may fail to accurately identify the distance between satellite 412 and apparatus 414. Such a discrepancy may be based, at least in part, on inaccurate time synchronization between GPS satellites, inaccurate time synchronization between GPS satellites and the apparatus, atmospheric variations, line of sight interference from buildings, multipath errors caused by indirect receipt of GPS data, and/or the like.

FIGS. 5A-5D are diagrams illustrating probe data according to at least one example embodiment. The examples of FIGS. 5A-5D are merely examples and do not limit the scope of the claims. For example, the amount of probe data may vary, the type of probe data may vary, the distribution of probe data may vary, the format of the probe data may vary, the representation of the probe data may vary, and/or the like.

In recent times, real time data of vehicular traffic is increasingly being collected, aggregated, processed, analyzed, stored, and/or the like. Such real time data may include information indicative of the speed of a vehicle, the location of a vehicle, the time the data was collected, and/or the like. For example, a particular data point within a set of real time data may indicate the speed of a vehicle at a particular location during a particular time period. Data points within a set of real time data may be referred to as probe data. Such probe data may, for example, be collected to create speed-vs-time curves, historical traffic models, to perform real time traffic analysis, to create forward looking traffic predictions, and/or the like. Probe data may be collected from vehicle mounted sensors, GPS-enabled devices (e.g. smart phones), road sensors, traffic cameras, traffic reports, witnesses, and/or the like. Probe data may be centrally collected and distributed, broadcast, and/or the like to various receivers, subscribers, and/or the like (e.g. via a wireless network), such as to mobile navigation systems, portable navigation systems, news organizations, electronic road signs, and/or the like. Alternatively, or in addition thereto, probe data may be collected by an apparatus, such as a mobile navigation system, a portable navigation system, a traffic reporting system, and/or the like for use by the apparatus. For example, a GPS system installed in a vehicle may record the position and speed of the vehicle at particular intervals (e.g. once every second) for use by the vehicle, the GPS system, and/or the like, road sensors may record the speed and time of vehicles as they pass a particular position, and transmit the data over a cellular data connection for reporting to a subscription service, and/or the like. It will be appreciated that probe data collected by vehicle mounted sensors, road sensors, GPS-enable devices, and/or the like may be distributed via wireless peer-to-peer or mesh-based networks, e.g. the data is passed from a source and then from vehicle to vehicle, each navigation system within a vehicle being both a consumer of the data and a repeater thereof. For example, probe data collected from vehicle-mounted sensors may be shared between vehicles by way of a vehicular ad hoc network, similar as described in the Institute of Electrical and Electronics Engineers (IEEE) 802.11 and 802.16 standards.

When probe data is received (e.g. from a service provider, from a sensor, and/or the like), the probe data may not be associated with a particular link segment. In circumstances where received probe data is not associated with a link segment, it may be desirable to match probe data to link segments on a map. For instance, the probe data may not identify a reference to a particular link segment, but utilization of the probe data for analysis, traffic reporting, and/or the like may be facilitated by associating the probe data with a particular link segment. For example, creation of a historical traffic model may be facilitated by associating probe data with a particular link segment. A historical traffic model may refer to a model of traffic behavior over time based, at least in part, on historical traffic data. For example, a historical traffic model may model the speed of a particular link segment at various times of the day based, at least in part, on data collected at similar times of day over an extended period of time, may model the location of a particular vehicle as the vehicle travels along a route based, at least in part, on data collected while the vehicle travels along the route, and/or the like. Probe data may be matched to a link segment on a map using a number of known methods. For example, a computer program may be utilized that associates location information comprised by particular probe data with particular link segments. For instance, probe data may include a position received from a GPS receiver, and the GPS coordinates may be utilized by the computer program to determine a corresponding link segment. In another example, probe data may be manually associated with link segments, though a manual approach may be labor intensive, insufficiently fast, and/or the like. It should be understood that a link segment may be unidirectional (e.g. traffic flows in one direction), bi-directional (e.g. traffic flows in two directions), comprise multiple lanes, and/or the like. In circumstances where the link segment is bi-directional and/or comprises multiple lanes, it may be desirable to match probe data to a link segment according to the direction of traffic flow, the lane associated with the probe data, and/or the like. For example, if the link segment is bi-directional, it may be desirable to only match probe data to the link segment associated with traffic flow in one direction, to divide the link segment into multiple link segments (e.g. each flow direction is a different link segment, each lane of a road is a single link segment, etc.), and/or the like. In this manner, probe data matched to the link segment may be limited to probe data that is indicative of the same direction of travel, indicative of probe data associated with a single lane of a road, and/or the like.

Figure 5A:
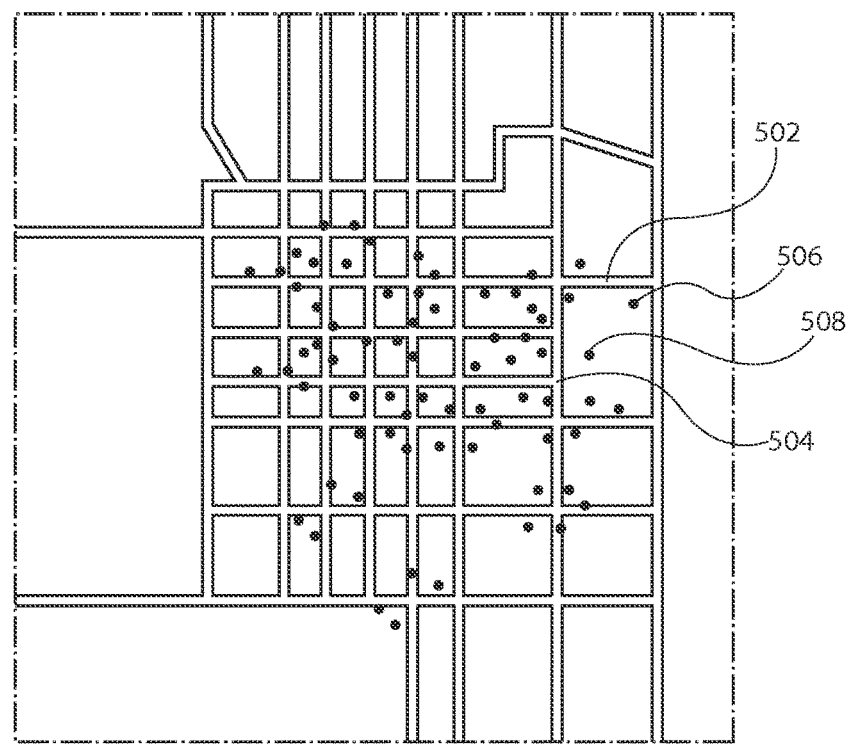
FIGS. 5A-5D are diagrams illustrating probe data according to at least one example embodiment.

FIG. 5A is a diagram illustrating a graphical representation of probe data according to at least one example embodiment. The example of FIG. 5A depicts a map of various roads and thoroughfares comprising link segments, such as link segment 502 and link segment 504 overlaid with locations associated with navigational signal measurements, such as locations 506 and 508. In this respect locations 506 and 508 may represent probe data. In some circumstances, probe data may be associated with a location that fails to comprise a link segment due to inaccuracies in the probe data. For example, the probe data may be associated with a location adjacent to a link segment, such as the location of a building, despite the probe data being recorded from the location of the link segment. For example, location 506 may represent a location indicated by a navigational signal measurement comprising a measurement error, similar as described regarding FIGS. 4A-4B from a point along link segment 502, and location 508 may represent a location indicated by a navigational signal measurement comprising a measurement error, similar as described regarding FIGS. 4A-4B from a point along link segment 504. As such, location 506 may be matched to link segment 502, and location 508 may be matched to 504. Similarly, other locations depicted in FIG. 5A may be matched to other link segments. Even though the example of FIG. 5A represents probe data graphically, probe data may be represented in other manners. For example, probe data may be a set of geographical coordinates, coded information, text, and/or the like.

As previously described, in some circumstances probe data may be matched to a link segment. In some circumstances, it may be desirable to aggregate probe data matched to a particular link segment into a set. For example, it may be desirable to compare the attributes of individual data points indicated by probe data taken at different times, measured at different positions, and/or the like along a link segment. For example, it may be desire to measure the difference in probe data points to detect errors, calculate averages, and/or the like for use in a traffic model, to refine navigational data, and/or the like. In at least one example embodiment, an apparatus receives probe data indicative of a set of navigational signal measurements that is matched to a link segment.

Figure 5B:
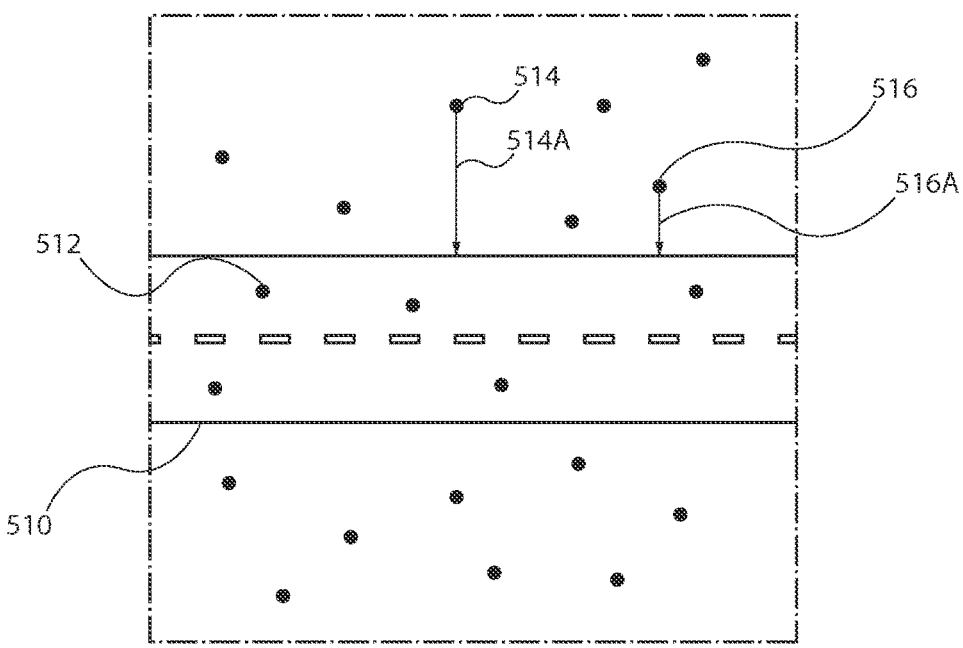

FIG. 5B is a diagram illustrating a graphical representation of probe data according to at least one example embodiment. The example of FIG. 5B depicts link segment 510 overlaid with locations associated with navigational signal measurements, such as locations 512, 514, and 516. In this respect locations 512, 514, and 516 may represent probe data. For example, location 514 may represent a location indicated by a navigational signal measurement similar as described regarding FIGS. 4A-4B from a point along link segment 510, and location 516 may represent a different location indicated by a different navigational signal measurement similar as described regarding FIGS. 4A-4B from a point along link segment 510. As such, locations 512, 514, and 516 may be matched to link segment 510. Similarly, other locations depicted in FIG. 5B may be matched to link segment 510. In this manner, the locations depicted in FIG. 5B may represent a set of navigational signal measurements that is matched to link segment 510. Even though the example of FIG. 5B represents probe data graphically, probe data may be represented in other manners. For example, probe data may be a set of geographical coordinates, coded information, text, and/or the like.

As previously described, a navigational signal measurement may be associated with a measurement error. For instance, GPS signals may be affected by multipath issues, where the radio signals reflect off surrounding terrain, such as buildings, canyon walls, hard ground, and/or the like. For example, it can be seen that location 512 of FIG. 5B lies on a position over link segment 510, while location 514 is a distance 514A away from a side of link segment 510, and location 516 is a distance 516A away from a side of link segment 510. Distances 514A and 516A may represent measurement errors from navigational signal measurement associated with locations 514 and 516. For example, probe data may be received from a navigational apparatus that indicates locations 514 and/or 516 while the navigational apparatus is located at a position overlying link segment 510. In circumstances such as these, it may be desirable to determine a set of measurement errors. For example, the measurement errors may be compared, averaged, normalized, and/or the like. Such operations may be used to compensate for the measurement errors, to improve navigation, and/or the like. In at least one example embodiment, an apparatus determines a determines a set of measurement errors such that each measurement error of the set of measurement errors is a difference between a location indicated by the link segment and a location indicated by a navigational signal measurement of the set of navigational signal measurements. For example, an apparatus may determine a set of measurement errors that indicate distances 514A and 516A as the difference between the location of link segment 510 and locations 514 and 516.

Even though FIG. 5B illustrates distances 514A and 516A as distances from a side of link segment 5B, it should be understood that a measurement error between a location indicated by the link segment and a location indicated by a navigational signal measurement may be a different distance. For example, the measurement error may be the distance between a location indicated by a navigational measurement and the center of a particular lane comprised by the link segment, the center of the link segment, a particular point along the link segment, and/or the like. For example, the distance between location 514 and the center stripe of link segment 510 may be a measurement error between a location indicated by link segment 510 and a location indicated by a navigational signal measurement associated with location 514.

Figure 5C:
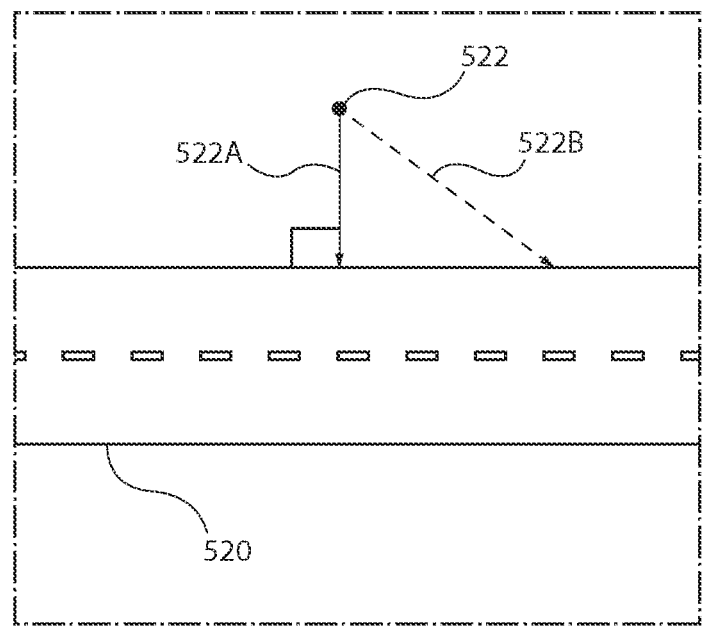

In some circumstances, a location associated with probe data may have a distance between the location and the link segment that is perpendicular to a link segment. For example, a link segment may run in a substantially straight direction. FIG. 5C is a diagram illustrating a graphical representation of probe data according to at least one example embodiment. The example of FIG. 5C depicts link segment 520 and location 522. It can be seen that location 522 is adjacent to link segment 520. In this respect locations 522 may represent probe data. For example, location 522 may represent a location indicated by a navigational signal measurement similar as described regarding FIGS. 4A-4B from a point along link segment 520. As such, locations 522 may be matched to link segment 520. It can be seen in the example of FIG. 5C that link segment 520 runs in a generally straight direction. Various distances can be measured between location 522 and link segment 520. For example, FIG. 5C depicts distance 522A between location 522 and link segment 520, and distance 522B between location 522 and link segment 520. It can be seen that in the example of FIG. 5C, distance 522A is perpendicular to link segment 520, and that distance 522B fails to be perpendicular to link segment 520. It can also be seen that in the example of FIG. 5C, distance 522A is a shorter distance than distance 522B.

In some circumstances, it may be desirable to identify a location indicated by a link segment to be a location along the link segment from which the location indicated by the navigational signal measurement is perpendicular. For example, if the navigational signal measurement system has an error similar as previously described, the location along the link segment from which the location indicated by the navigational signal measurement is perpendicular may represent a best estimate of a navigational signal measurement lacking the error. In at least one example embodiment, an apparatus identifies the location indicated by a link segment to be a location along the link segment from which the location indicated by a navigational signal measurement is perpendicular. For example, the apparatus may identify a location indicated by link segment 520 of FIG. 5C to be the location along link segment 530 that is perpendicular to a navigational signal measurement associated with location 522. In at least one example embodiment, difference between the link segment location and the location indicated by the navigational signal measurement is based, at least in part, on a perpendicular distance from the link segment to the location indicated by the navigational signal measurement. For example, a difference between a link segment location and the location indicated by a navigational signal measurement may be based on distance 522A of FIG. 5C. In at least one example the difference between a link segment location and a location indicated by the navigational signal measurement is the perpendicular distance from the link segment to the location indicated by the navigational signal measurement.

Figure 5D:
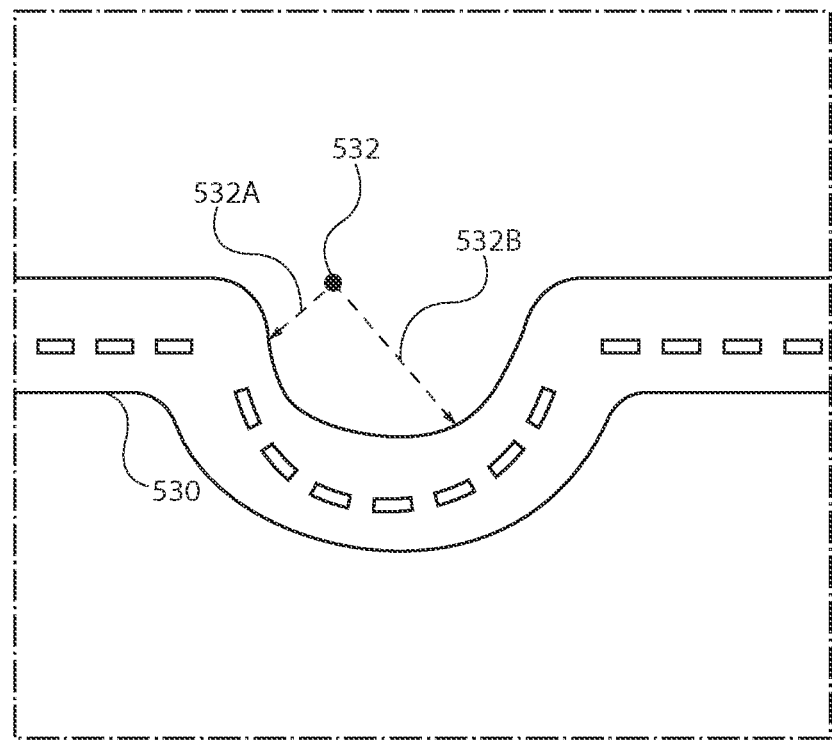

In some circumstances, a location associated with probe data may have multiple distances between the location and the link segment that have a similar angle with respect to a link segment. For example, a link segment may have an irregular geometry such that a location may be perpendicular to multiple points of the link segment. FIG. 5D is a diagram illustrating a graphical representation of probe data according to at least one example embodiment. The example of FIG. 5D depicts link segment 530 and location 532. It can be seen that location 532 is adjacent to link segment 530. In this respect location 532 may represent probe data. For example, location 532 may represent a location indicated by a navigational signal measurement similar as described regarding FIGS. 4A-4B from a point along link segment 530. As such, locations 532 may be matched to link segment 530. It can be seen in the example of FIG. 5D that link segment 530 runs in a generally straight direction, but has an irregular section comprising a curve. Various distances can be measured between location 532 and link segment 530. For example, FIG. 5D depicts distance 532A between location 532 and link segment 530, and distance 532B between location 532 and link segment 530. It can be seen that in the example of FIG. 5D, distance 532A and distance 532B have an approximately similar angle to link segment 530. It can also be seen that in the example of FIG. 5D, distance 532A is a shorter distance than distance 532B.

In some circumstances, it may be desirable to identify a location indicated by a link segment to be a location along the link segment that is nearest to the location indicated by the navigational signal measurement. For example, if the navigational signal measurement system has an error similar as previously described, the location along the link segment from which the location indicated by the navigational signal measurement is nearest may represent a best estimate of a navigational signal measurement lacking the error. In at least one example embodiment, an apparatus identifies a location indicated by a link segment to be a location along the link segment that is nearest to the location indicated by a navigational signal measurement. For example, the apparatus may identify a location indicated by link segment 530 of FIG. 5D to be the location along link segment 530 that is nearest the location indicated by a navigational signal measurement associated with location 532.

As previously described, in some circumstances an apparatus may receive probe data indicative of a set of navigational signal measurements comprising measurement errors that is matched to a link segment. In some circumstances, it may be desirable to determine one or more statistical attributes of the set of measurement errors. For example, the variance of the measurement errors perpendicular to a link segment may be converted into an input for a Kalman filter, similar as described regarding FIGS. 9-10. For instance, a Kalman filter may be based on an estimate of noise. The statistical attribute may be used as an estimate of noise. In at least one example embodiment, an apparatus determines at least one statistical attribute of a set of measurement errors. For example, an apparatus may determine the variance of the set of measurement errors, the mean of the set of measurement errors, or any other statistical attribute of the set of measurement errors. In at least one example embodiment, the statistical attribute is a variance of the set of measurement errors. Variance may refer to a measure of how far a set of numbers is spread out. For example, the variance of a set of measurement errors may be calculated as $$\sigma^2 = \frac{1}{N-1}\sum_{i=1}^{N}(x_i - \mu)^2$$

where N is the number of measurement errors with a value $x_i$ and $\mu$ is the mean of the measurement errors. In some circumstances, it may be desirable to calculate the variance based, at least in part, on signed measurement errors. A signed measurement error may refer to a measurement error having a positive or negative value. For instance, in the example of FIG. 5B, locations above link segment 510 (such as location 514) may have a positive measurement error, and locations below link segment 510 may have a negative measurement error. In this manner, the sign of the measurement error (positive or negative) may be indicative of a direction of the location from the link segment.

In some circumstances, it may be desirable to determine an adjusted statistical attribute of the set of measurement errors. An adjusted statistical attribute may refer to a statistical attribute that is adjusted in respect to another attribute. For instance, in some circumstances, it may be desirable to compensate for multiple lanes of a link segment when determining a statistical attribute of measurement errors. For example, if the measurement errors are in reference to a centerline of a multiple lane road, then the measurement errors may include a component that reflects an offset from a lane centerline to the road centerline. In circumstances where the road has a single lane in each direction, and statistical attributes are determined for measurement errors associated with each direction of travel, then the lane centerline to road centerline distance will affect a mean, but not a variance statistic. In circumstances where the road has multiple lanes in each direction, then the variance of measurement errors will increase with the number of lanes, even if the actual measurement error of the navigational signal measurements is constant. A determination of a statistical attribute of measurement errors may use a link-segment attribute indicative a number of lanes and an average lane width of the link segment to determine a variance of measurement errors adjusted down to estimate the equivalent single lane variance of the measurement errors. In at least one example embodiment, an apparatus determines an adjusted statistical attribute of the set of measurement errors, based at least in part, on an average lane width and a number of lanes comprised by the link segment. In at least one example embodiment, a statistical attribute is an adjusted statistical attribute. For example, in circumstances where a simplifying assumption that a link segment has a fixed number of adjacent lanes of uniform width is used, and each measurement is labeled with an index of the lane from which the measurement was made, then $\sigma^2$=VarianceOfMeasuredProbePositionsInDirection-PerpendicularToRoad−LaneWidth$^2$*Var(LaneIndex)

may be used to determine an adjusted statistical attribute of the set of measurement errors, where $\sigma^2$ is the estimated variance of the measurement errors in the direction perpendicular to the road. In circumstances where the lane indices are unavailable, it may be desirable to further simplify the adjustment using an assumption that the apparatuses generating the measurements are equally likely to be in any of the lanes. In this case the adjusted variance estimate may be given by $$\sigma^2 = VarianceOfMeasuredProbePositionsInDirectionPerpendicularToRoad - LaneWidth^2\left(\frac{L^2-1}{12}\right)$$

where L is the number of lanes.

In some circumstances, it may be desirable to determine a variance of a set of measurement errors, but the values of the measurement errors may be unavailable. For example, a navigational signal measurement may be matched to a link segment, but the navigational signal measurement may not be matched to a particular point along the link segment. In circumstances such as these, the variance of the measurement errors may be determined by an eigenvalue analysis. For example, navigational signal measurements may be matched to a straight link segment, and an eigenvalue analysis applied to a matrix of position covariances may be used to estimate the variance of the positions of navigational signal measurements in the direction perpendicular to the link segment. Such an example may be applied to a curved link segment, because a curved road may be approximated as a sequence of short straight line segments. In at least one example embodiment, statistical attribute is determined by way of an eigenvalue analysis.

In some circumstances, it may be desirable to store an indication of the statistical attribute. For example, it may be desirable to store an indication of the statistical attribute in map information associated with the link segment. In this manner, the indication of the statistical attribute may be used at a later time, with other apparatuses, and/or the like. For example, the statistical attribute may be stored in geographic database similar as described regarding FIG. 1. In at least one example embodiment, an apparatus stores an indication of a statistical attribute in map information associated with a link segment. The indication of the statistical attribute may be the statistical attribute itself, an attribute related to the statistical attribute, such as an inverse of the attribute, a predetermined range that comprises the statistical attribute (e.g. a range of errors), a memory location that references the statistical attribute, and/or the like. In at least one example embodiment, an indication of a statistical attribute is the statistical attribute. In at least one example embodiment, the indication of the statistical attribute identifies a predetermined range that comprises the statistical attribute.

Figure 6:
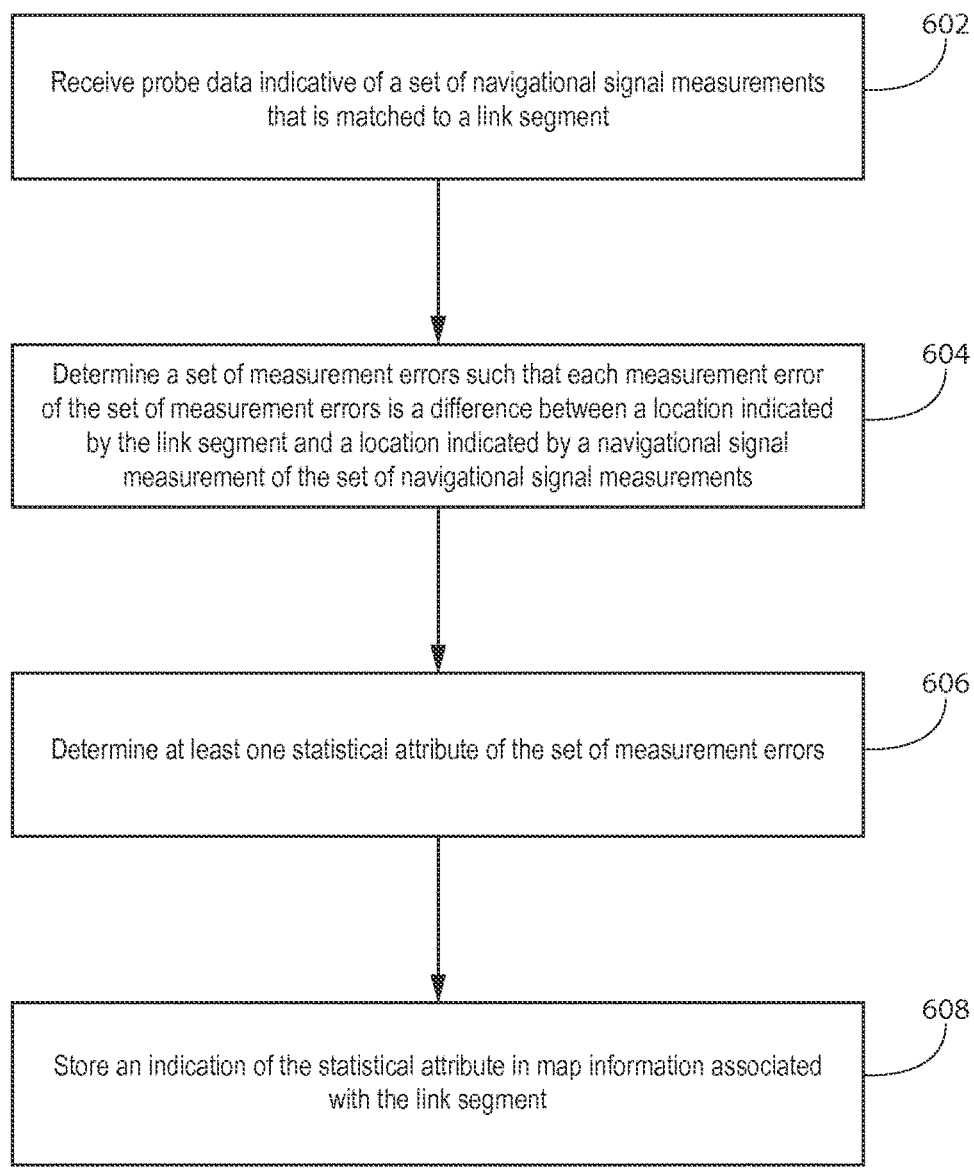
FIG. 6 is a flow diagram illustrating activities associated with determination of a statistical attribute of a set of measurement errors according to at least one example embodiment.

FIG. 6 is a flow diagram illustrating activities associated with determination of a statistical attribute of a set of measurement errors according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 6.

At block 602, the apparatus receives probe data indicative of a set of navigational signal measurements that is matched to a link segment. The receipt, the probe data, navigational signal measurements, the matching, and the link segment may be similar as described regarding FIG. 1, FIG. 2, FIG. 3, FIGS. 4A-4B, and FIGS. 5A-5D.

At block 604, the apparatus determines a set of measurement errors such that each measurement error of the set of measurement errors is a difference between a location indicated by the link segment and a location indicated by a navigational signal measurement of the set of navigational signal measurements. The determination, the measurement errors, the differences, and the locations may be similar as described regarding FIG. 1, FIG. 3, FIGS. 4A-4B, and FIGS. 5A-5D.

At block 606, the apparatus determines at least one statistical attribute of the set of measurement errors. The determination and the statistical attribute may be similar as described regarding FIGS. 5A-5D.

At block 608, the apparatus stores an indication of the statistical attribute in map information associated with the link segment. The storage, the indication, the map information, and the association may be similar as described regarding FIG. 1, FIG. 3, FIGS. 4A-4B, and FIGS. 5A-5D.

As an apparatus, such as a navigational system changes locations, it may be necessary to receive different probe data. For example, the apparatus may initially be located at link segment 502 of FIG. 5A, and change locations to link segment 504. In circumstances such as these, the apparatus may perform the activities of FIG. 6 with respect to the different link segment. In at least one example embodiment, an apparatus receives different probe data indicative of a different set of navigational signal measurements that is matched to a different link segment, determines a different set of measurement errors such that each measurement error of the different set of measurement errors is a difference between a location indicated by the different link segment and a location indicated by a navigational signal measurement of the different set of navigational signal measurements, determines at least one different statistical attribute of the different set of measurement errors, and stores the different statistical attribute in map information associated with the different link segment.

Figure 7:
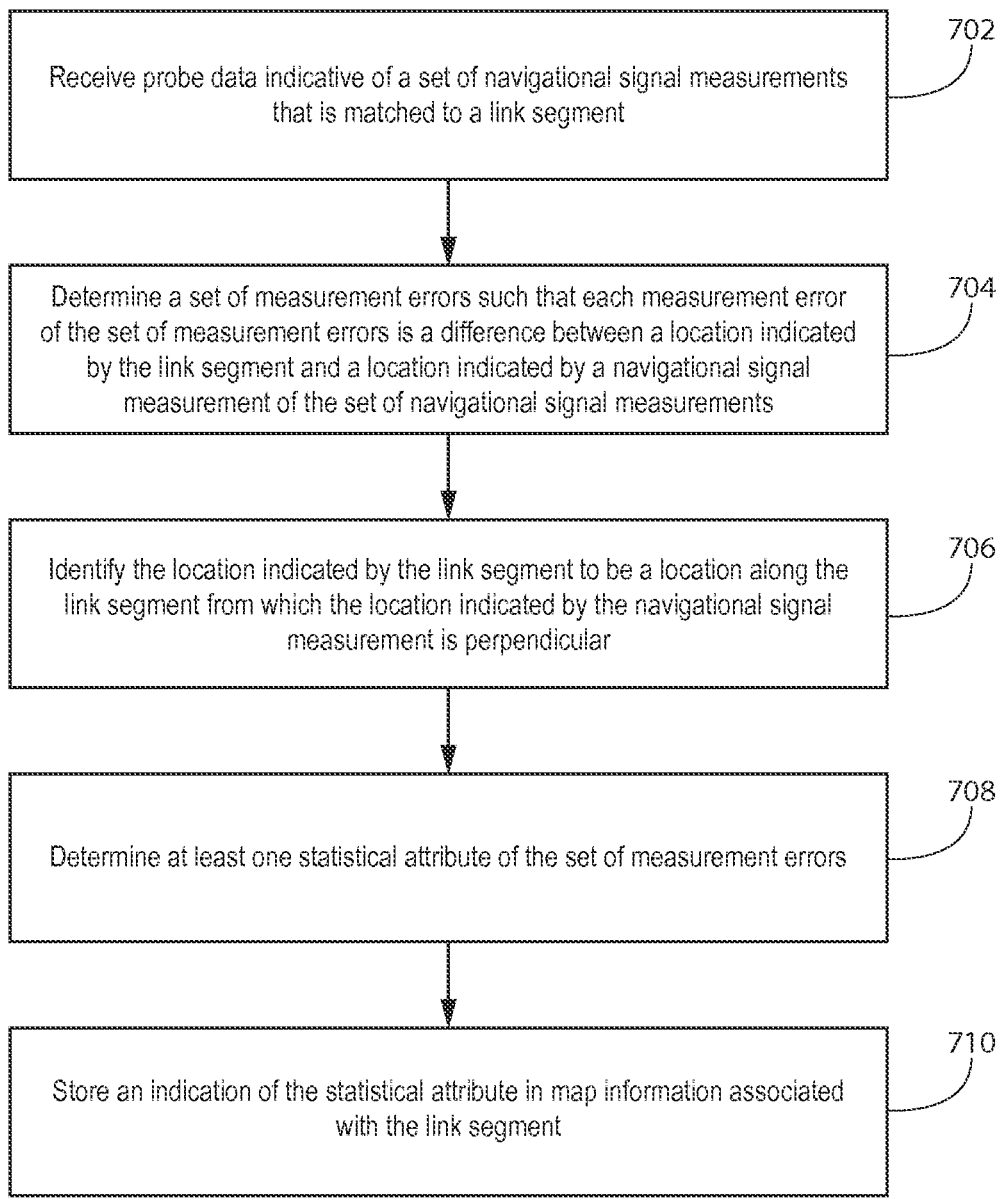
FIG. 7 is a flow diagram illustrating activities associated with identifying a location indicated by a link segment according to at least one example embodiment.

FIG. 7 is a flow diagram illustrating activities associated with identifying a location indicated by a link segment according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 7.

As previously described, in some circumstances an apparatus may identify a location indicated by a link segment to be a location along the link segment from which a location indicated by a navigational signal measurement is perpendicular.

At block 702, the apparatus receives probe data indicative of a set of navigational signal measurements that is matched to a link segment, similarly as described regarding block 602 of FIG. 6. At block 704, the apparatus determines a set of measurement errors such that each measurement error of the set of measurement errors is a difference between a location indicated by the link segment and a location indicated by a navigational signal measurement of the set of navigational signal measurements, similarly as described regarding block 604 of FIG. 6.

At block 706, the apparatus identifies the location indicated by the link segment to be a location along the link segment from which the location indicated by the navigational signal measurement is perpendicular. The identification and the location along the link segment may be similar as described regarding FIGS. 5A-5D.

At block 708, the apparatus determines at least one statistical attribute of the set of measurement errors, similarly as described regarding block 606 of FIG. 6. At block 710, the apparatus stores an indication of the statistical attribute in map information associated with the link segment, similarly as described regarding block 608 of FIG. 6.

Figure 8:
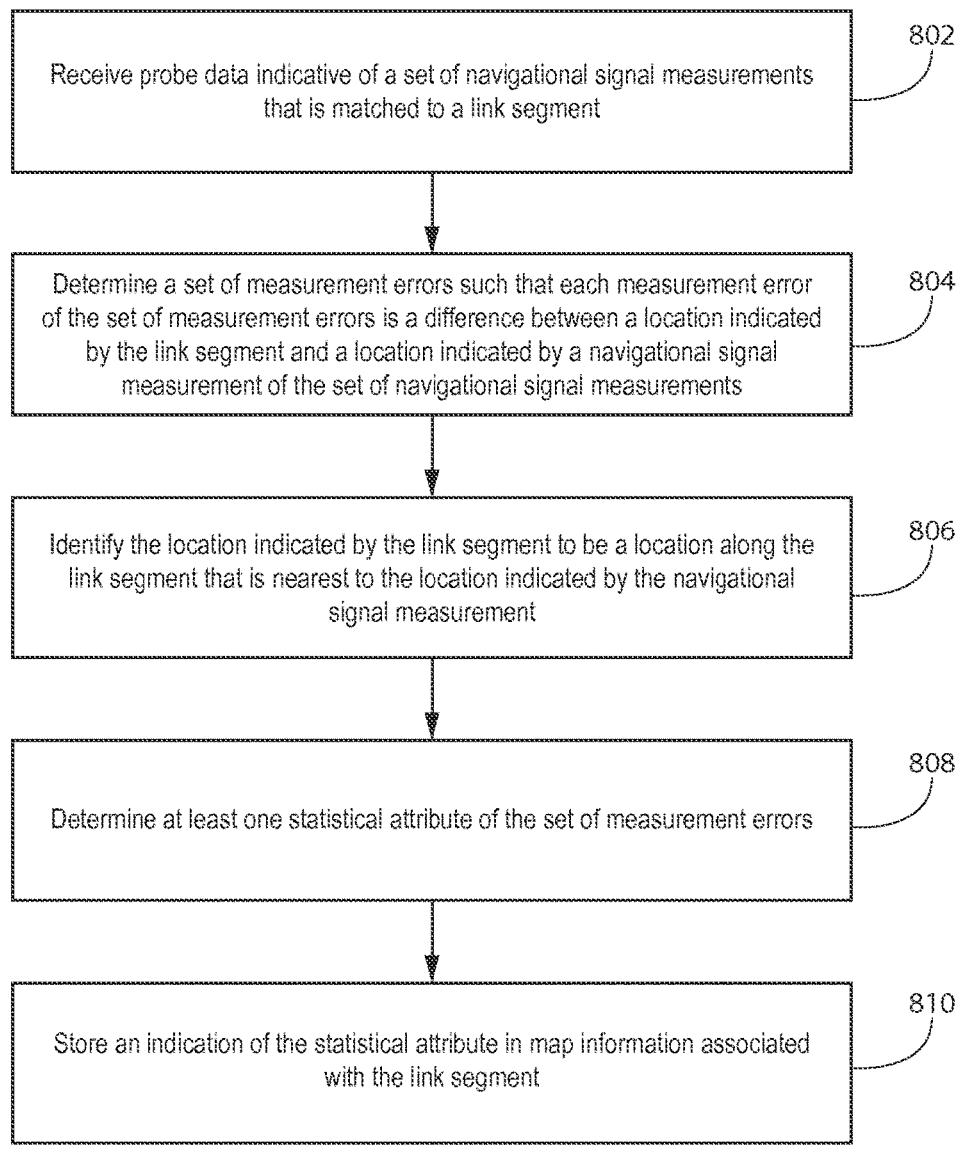
FIG. 8 is a flow diagram illustrating activities associated with identifying a location indicated by a link segment according to at least one example embodiment.

FIG. 8 is a flow diagram illustrating activities associated with identifying a location indicated by a link segment according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, in some circumstances an apparatus may identify a location indicated by a link segment to be a location along the link segment that is nearest to a location indicated by the navigational signal measurement.

At block 802, the apparatus receives probe data indicative of a set of navigational signal measurements that is matched to a link segment, similarly as described regarding block 602 of FIG. 6. At block 804, the apparatus determines a set of measurement errors such that each measurement error of the set of measurement errors is a difference between a location indicated by the link segment and a location indicated by a navigational signal measurement of the set of navigational signal measurements, similarly as described regarding block 604 of FIG. 6.

At block 806, the apparatus identifies the location indicated by the link segment to be a location along the link segment that is nearest to the location indicated by the navigational signal measurement. The identification and the location along the link segment may be similar as described regarding FIGS. 5A-5D.

At block 808, the apparatus determines at least one statistical attribute of the set of measurement errors, similarly as described regarding block 606 of FIG. 6. At block 810, the apparatus stores an indication of the statistical attribute in map information associated with the link segment, similarly as described regarding block 608 of FIG. 6.

Figure 9:
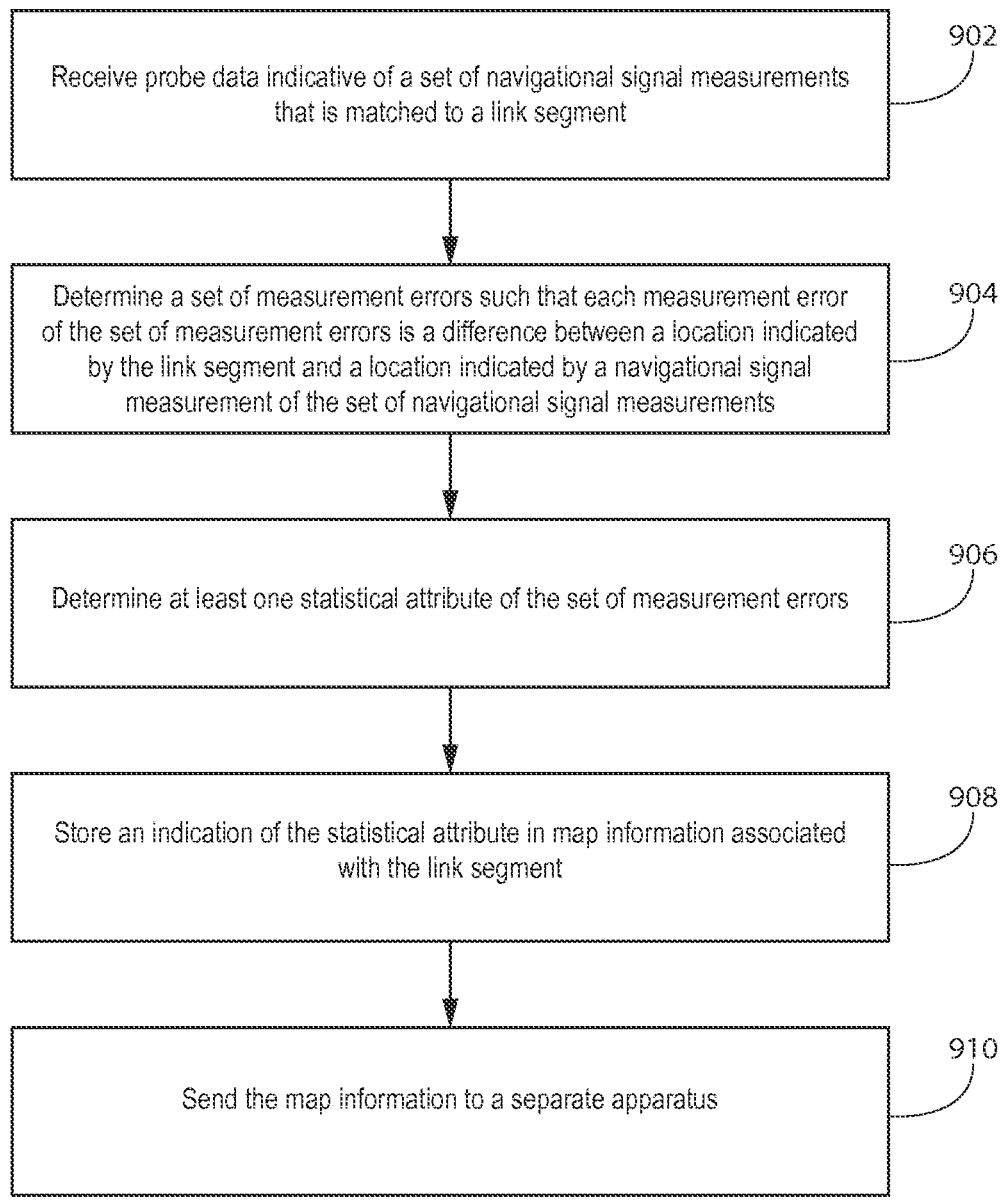
FIG. 9 is a flow diagram illustrating activities associated with sending map information to an apparatus according to at least one example embodiment.

FIG. 9 is a flow diagram illustrating activities associated with sending map information to an apparatus according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 9.

Navigation systems, such as a mobile phone, a personal navigation device, an automotive navigation system, and/or the like may utilize position estimates in order to determine instructions to present to the user. For example, the device may rely on knowledge that a vehicle position is 100 feet from a turn in order to say, "Turn left in 100 feet" while 100 feet from the turn. When both an inertial measurement unit (IMU) and a satellite navigation system (e.g. a GPS) are available to the navigation system to provide position estimates, a Kalman filter may be used to combine the two types of position estimates. Kalman filtering may refer to an algorithm that uses a series of measurements observed over time which contain noise (random variations) and other inaccuracies, and produces estimates of unknown variables that tend to be more precise than those based on a single measurement alone. A Kalman filter may be thought of as calculating a weighted average, with the weights being functions of the noise in the signals. That is to say, noisier signals get smaller weights.

As previously described, in some circumstances an apparatus may determine a statistical attribute of a set of measurement errors. For example, the apparatus may determine a variance of the measurement errors. Such statistical attributes may be used to provide error correction, adjustment, and/or the like. For example, a statistical attribute such as variance may be used as an input for a Kalman filter. In circumstances such as these, it may be desirable to send an indication of a statistical attribute to an apparatus. For example, an apparatus may receive map information from a geographic database. For example, the map information may include information related to link segments affected by multipath errors (e.g. an "urban canyon"), and may further include an indication of a statistical attribute that may be used to compensate for the errors. In at least one example embodiment, the apparatus is a navigational signal receiver.

In some circumstances, an apparatus may be able to determine a statistical attribute in real time. For example, a navigational signal receiver may be able to receive real time probe data from other apparatuses. For example, the navigational signal receiver may be able to receive real time probe data from other navigational signal receivers by way of wireless peer-to-peer or mesh-based networks, similar as described regarding FIGS. 5A-5D. In circumstances such as these, it may be unnecessary to store a statistical attribute, receive a statistical attribute, send a statistical attribute to a separate apparatus, and/or the like. For example, a group of autonomous vehicles comprising navigational signal receivers may communicate by way of a wireless peer-to-peer network. In such an example, each autonomous vehicle may share real time probe data with the other autonomous vehicles within the group. Each autonomous vehicle may determine a statistical attribute of a set of measurement errors of the real-time probe data. For example, the variance of the set of measurement errors may be determined. In such an example, the statistical value may be utilized to compensate for errors of the navigational signal receiver. For example, each autonomous vehicle may use variance of the set of measurement errors as an input for a Kalman filter.

At block 902, the apparatus receives probe data indicative of a set of navigational signal measurements that is matched to a link segment, similarly as described regarding block 602 of FIG. 6. At block 904, the apparatus determines a set of measurement errors such that each measurement error of the set of measurement errors is a difference between a location indicated by the link segment and a location indicated by a navigational signal measurement of the set of navigational signal measurements, similarly as described regarding block 604 of FIG. 6. At block 906, the apparatus determines at least one statistical attribute of the set of measurement errors, similarly as described regarding block 606 of FIG. 6. At block 908, the apparatus stores an indication of the statistical attribute in map information associated with the link segment, similarly as described regarding block 608 of FIG. 6.

At block 910, the apparatus sends the map information to a separate apparatus. In at least one example embodiment, the map information comprises the indication of the statistical attribute. The sending and the separate apparatus may be similar as described regarding FIG. 1, FIG. 2, FIG. 3, FIGS. 4A-4B, and FIGS. 5A-5D.

Figure 10:
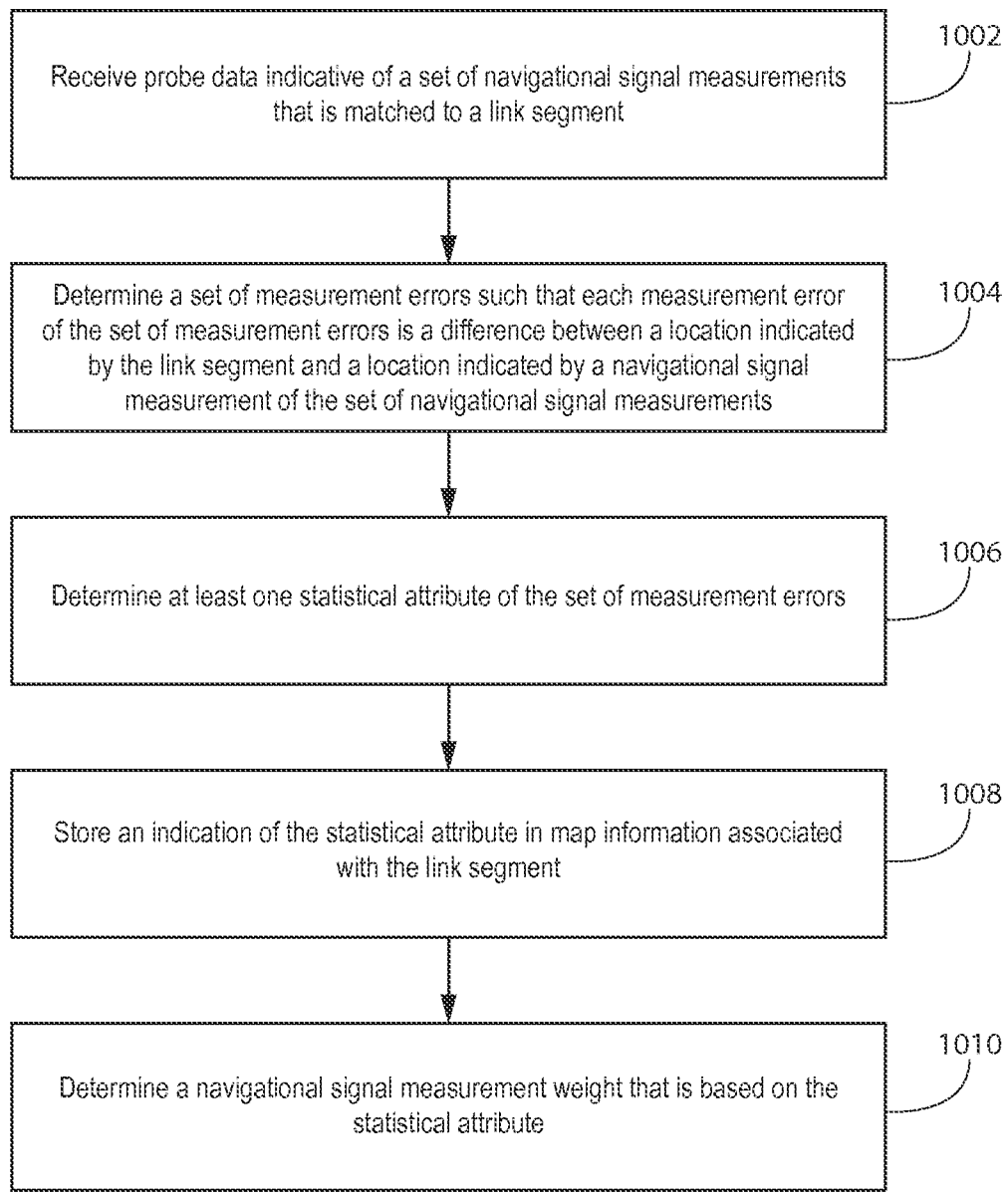
FIG. 10 is a flow diagram illustrating activities associated with determining a navigational signal measurement weight according to at least one example embodiment.

FIG. 10 is a flow diagram illustrating activities associated with determining a navigational signal measurement weight according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 10.

In some circumstances, it may be desirable to determine a navigational signal measurement weight based, at least in part, on the statistical attribute. For instance, the indication of the statistical attribute may be indicative of the navigational signal measurement weight. For example, in circumstances where the statistical attribute is a variance, the statistical attribute may be used as an input to a Kalman Filter, and the Kalman filter may determine a navigational signal measurement weight that designates a Kalman filter weight to be applied to a navigational signal measurement received by a navigational signal receiver, similar as described regarding FIG. 9. The weight may be based on other factors, such as the noise characteristics of other sensors, the specific gain used with the Kalman filter, and/or the like. In at least one example embodiment, a navigational signal measurement weight designates a Kalman filter weight to be applied to a navigational signal measurement received by a navigational signal receiver in circumstances where a location of the navigational signal receiver corresponds with a location indicated by the link segment. For example, the link segment may correspond with an "urban canyon." In at least one example embodiment, the indication of the statistical attribute identifies a predetermined range that comprises the navigational signal measurement weight. For example, the indication of the statistical attribute may identify a range of variances of measurement error. In at least one example embodiment, the navigational signal measurement weight is inversely proportional to the statistical attribute. For example, in circumstances where the statistical attribute is variance, it may be desirable for a navigational signal measurement weight based on the variance to be given lower weight when the variance is high, and be given a higher weight when the variance is low.

At block 1002, the apparatus receives probe data indicative of a set of navigational signal measurements that is matched to a link segment, similarly as described regarding block 602 of FIG. 6. At block 1004, the apparatus determines a set of measurement errors such that each measurement error of the set of measurement errors is a difference between a location indicated by the link segment and a location indicated by a navigational signal measurement of the set of navigational signal measurements, similarly as described regarding block 604 of FIG. 6. At block 1006, the apparatus determines at least one statistical attribute of the set of measurement errors, similarly as described regarding block 606 of FIG. 6. At block 1008, the apparatus stores an indication of the statistical attribute in map information associated with the link segment, similarly as described regarding block 608 of FIG. 6

At block 1010, the apparatus determines a navigational signal measurement weight. In at least one example embodiment, the navigational signal measurement weight is based, at least in part, on the statistical attribute. The determination, the navigational signal measurement weight, and the statistical attribute may be similar as described regarding FIGS. 5A-5D and FIG. 9.

One or more example embodiments may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 602 of FIG. 6 may be performed after block 604 of FIG. 6. Furthermore, if desired, one or more of the above-described functions may be optional or may be combined. For example, block 706 of FIG. 7 may be optional and/or combined with block 708 of FIG. 7.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. An apparatus, comprising:
   at least one processor; and
   at least one memory including computer program code, the memory and the computer program code configured to, working with the processor, cause the apparatus to perform at least the following:
   receive probe data indicative of a set of navigational signal measurements that is matched to a link segment;
   determine a set of measurement errors such that each measurement error of the set of measurement errors is a difference between a location indicated by the link segment and a location indicated by a navigational signal measurement of the set of navigational signal measurements;
   determine at least one statistical attribute of the set of measurement errors;
   store an indication of the statistical attribute in map information associated with the link segment; and
   use the statistical attribute associated with the link segment as an input to compensate for errors in the navigational signal measurements to facilitate at least one of autonomous vehicle navigation or route guidance.

2. The apparatus of claim 1, wherein the statistical attribute is a variance of the set of measurement errors.

3. The apparatus of claim 1, wherein the determination of the statistical attribute comprises determination of an adjusted statistical attribute of the set of measurement errors based, at least in part, on an average lane width and a number of lanes comprised by the link segment, and the statistical attribute is the adjusted statistical attribute.

4. The apparatus of claim 1, wherein the memory includes computer program code configured to, working with the processor, cause the apparatus to perform identification of the location indicated by the link segment to be a location along the link segment from which the location indicated by the navigational signal measurement is perpendicular.

5. The apparatus of claim 1, wherein the memory includes computer program code configured to, working with the processor, cause the apparatus to perform identification of the location indicated by the link segment to be a location along the link segment that is nearest to the location indicated by the navigational signal measurement.

6. The apparatus of claim 1, wherein the difference between the link segment location and the location indicated by the navigational signal measurement is based, at least in part, on a perpendicular distance from the link segment to the location indicated by the navigational signal measurement.

7. The apparatus of claim 5, wherein the difference between the link segment location and the location indicated by the navigational signal measurement is the perpendicular distance from the link segment to the location indicated by the navigational signal measurement.

8. The apparatus of claim 1, wherein the memory includes computer program code configured to, working with the processor, cause the apparatus to perform sending of the indication of the statistical attribute to a separate apparatus.

9. The apparatus of claim 1, wherein the memory includes computer program code configured to, working with the processor, cause the apparatus to perform determination of a navigational signal measurement weight that is based, at least in part, on the statistical attribute, wherein the indication of the statistical attribute is indicative of the navigational signal measurement weight.

10. A method comprising:
    receiving probe data indicative of a set of navigational signal measurements that is matched to a link segment;

determining a set of measurement errors such that each measurement error of the set of measurement errors is a difference between a location indicated by the link segment and a location indicated by a navigational signal measurement of the set of navigational signal measurements;

determining at least one statistical attribute of the set of measurement errors;

storing an indication of the statistical attribute in map information associated with the link segment; and using the statistical attribute associated with the link segment as an input to compensate for errors in the navigational signal measurements to facilitate at least one of autonomous vehicle navigation or route guidance.

11. The method of claim 10, further comprising identifying the location indicated by the link segment to be a location along the link segment from which the location indicated by the navigational signal measurement is perpendicular.

12. The method of claim 10, further comprising identifying the location indicated by the link segment to be a location along the link segment that is nearest to the location indicated by the navigational signal measurement.

13. The method of claim 12, wherein the difference between the link segment location and the location indicated by the navigational signal measurement is the perpendicular distance from the link segment to the location indicated by the navigational signal measurement.

14. The method of claim 10, further comprising sending the indication of the statistical attribute to a separate apparatus.

15. The method of claim 10, wherein the determination of the statistical attribute comprises determining an adjusted statistical attribute of the set of measurement errors based, at least in part, on an average lane width and a number of lanes comprised by the link segment, and the statistical attribute is the adjusted statistical attribute.

16. The method of claim 10, further comprising determining a navigational signal measurement weight that is based, at least in part, on the statistical attribute, wherein the indication of the statistical attribute is indicative of the navigational signal measurement weight.

17. At least one non-transitory computer-readable medium encoded with instructions that, when executed by a processor, perform:

receipt of probe data indicative of a set of navigational signal measurements that is matched to a link segment;

determination of set of measurement errors such that each measurement error of the set of measurement errors is a difference between a location indicated by the link segment and a location indicated by a navigational signal measurement of the set of navigational signal measurements;

determination of at least one statistical attribute of the set of measurement errors;

storage of an indication of the statistical attribute in map information associated with the link segment; and use of the statistical attribute associated with the link segment as an input to compensate for errors in the navigational signal measurements to facilitate at least one of autonomous vehicle navigation or route guidance.

18. The medium of claim 17, further encoded with instructions that, when executed by a processor, perform identification of the location indicated by the link segment to be a location along the link segment from which the location indicated by the navigational signal measurement is perpendicular.

19. The medium of claim 17, further encoded with instructions that, when executed by a processor, perform sending of the indication of the statistical attribute to a separate apparatus.

20. The medium of claim 17, wherein the determination of the statistical attribute comprises determination of an adjusted statistical attribute of the set of measurement errors based, at least in part, on an average lane width and a number of lanes comprised by the link segment, and the statistical attribute is the adjusted statistical attribute.

* * * * *